United States Patent [19]
Lalk et al.

[11] 3,900,619
[45] Aug. 19, 1975

[54] INHIBITING THE STAINING OF LATEX PAINTS ON WOOD

[75] Inventors: Robert H. Lalk; Donald L. Schmidt; Mary R. Thomas, all of Midland, Mich.

[73] Assignee: The Dow Chemical Company, Midland, Mich.

[22] Filed: July 26, 1973

[21] Appl. No.: 382,978

[52] U.S. Cl. .................. 427/408; 21/7; 106/15 AF; 260/29.6 MQ; 260/29.6 SQ; 260/29.6 Z; 427/325
[51] Int. Cl. .............................................. B44d 1/26
[58] Field of Search ............. 260/29.6 MQ, 29.6 SQ, 260/29.6 Z; 106/15 AF; 117/148, 57

[56] References Cited
UNITED STATES PATENTS

| | | | |
|---|---|---|---|
| 3,102,867 | 9/1963 | Buhle ........................ | 260/29.6 MQ |
| 3,322,737 | 5/1967 | Kangas .................... | 260/29.6 MQ X |
| 3,438,914 | 4/1969 | Kruckenberger ....... | 260/29.6 MQ X |
| 3,636,052 | 1/1972 | Hatch et al. .................. | 260/47 R X |
| 3,660,431 | 5/1972 | Hatch et al. .................. | 260/47 R X |

*Primary Examiner*—Lucille M. Phynes
*Attorney, Agent, or Firm*—Chessie E. Rehberg

[57] ABSTRACT

The staining of latex paints on wood due to bleeding of water-soluble tannin into the paint film is inhibited by the application to the wood of a water-soluble S-aryl cycloaliphatic sulfonium compound prior to or concurrently with the application of the latex paint.

13 Claims, No Drawings

INHIBITING THE STAINING OF LATEX PAINTS ON WOOD

BACKGROUND OF THE INVENTION

When a latex (i.e., water-based) paint is applied to wood having a high content of water-soluble tannin, such as redwood or red cedar lumber, the tannin often bleeds (i.e., migrates) into the paint film, thereby causing a dark stain in the film. When additional coats of latex paint are applied, the stain often bleeds through and continues to be visible.

U.S. Pat. Nos. 3,636,052 and 3,660,431 disclose sulfonium compounds that are useful in practicing the present invention and indicate that they can be polymerized to form solid resins that are useful as coatings.

Other sulfonium compounds useful in practicing the invention are disclosed in the copending applications of one of us (Donald L. Schmidt) with Hugh B. Smith, Melvin J. Hatch and William E. Broxterman, Ser. No. 382,976 and 382,977, filed July 26, 1973, the disclosures of which are hereby incorporated by reference.

SUMMARY OF THE INVENTION

The staining of latex paints when applied to wood having a high tannin content because of the migration of tannin into the paint film is inhibited by applying to the wood, prior to or concurrently with application of the paint, an aqueous solution of a S-aryl-cycloaliphatic sulfonium compound. Suitable such compounds include those of Formula I:

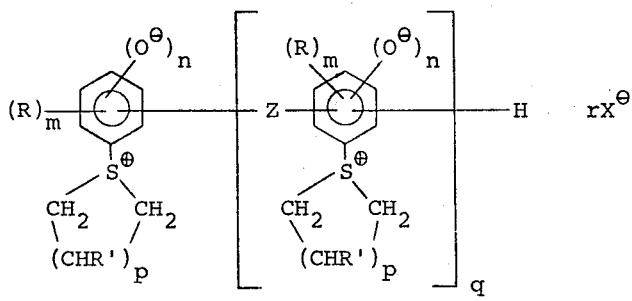

I wherein each R independently is Cl, phenyl, phenoxy, lower alkyl or lower alkoxy; each R' independently is H, Cl, Br, OH or lower alkyl; Z is a chemical bond, O, S, alkylene or alkylenedioxy; $m$ is 0–2, $n$ is 0–1, $p$ is 2–3, $q$ is 0–5, X is a neutralizing anion and r is a number such that the molecule is electrically neutral.

DETAILED DESCRIPTION OF THE INVENTION

In practicing the invention, one or more watersoluble compounds of Formula I are dissolved in an aqueous medium and the solution is applied to the wood to be painted. The aqueous medium may be water alone or it may be an aqueous solution or dispersion containing other materials. In a preferred mode of practicing the invention, the sulfonium compound is added to a latex primer paint. While this mode may not have maximum efficiency in inhibiting staining of the primer coat when applied to wood, it is highly effective in inhibiting the bleeding of the stain from the primer coat into the top coat or coats.

While the concentration of the sulfonium compound in the solution and the amount of solution applied may be varied widely, depending on the type of wood to be treated and the degree of stain inhibition required, it is usually satisfactory to use a concentration of about 0.25 to 10% by weight, and preferably about 0.5–5%, and to apply only a sufficient amount to thoroughly wet the surface of the wood. Application may be made by brush, roller, spray or other means.

It has been noted that the sulfonium compounds not only inhibit staining but also usually improve the water resistance and adhesion of the paint film applied therewith or thereover, whereas the known additives for stain control usually have the opposite effects. For this reason, latex paints containing a sulfonium compound of Formula I have improved properties even when applied to nonstaining woods or to nonwood surfaces.

The preferred mode of practicing the invention is to add the sulfonium compound to the latex paint that is to be used in painting wood that tends to stain latex paints. Substantially any latex paint that is useful on wood surfaces can be used, the most common types being those based on polymeric esters of acrylic and/or methacrylic acid or on polyvinyl acetate. The sulfonium compounds are compatible with such paints and can be added directly thereto, preferably in the form of an aqueous solution.

Since the sulfonium compounds substantially eliminate the need for a sealer on new wood surfaces before paint is applied, their use in latex paints provides for the first time a satisfactory one-coat latex paint for wood surfaces.

As pointed out above, a wide variety of suitable sulfonium compounds and methods for their preparation are disclosed in U.S. Pat. Nos. 3,636,052 and 3,660,431, the disclosures of which are incorporated herein by reference. Substantially all of the compounds there disclosed are useful in practicing the present invention and others may be made by the methods there disclosed.

The above-cited copending applications describe additional suitable compounds that are similar to those of the above patents except that they are devoid of phenolic OH groups; hence, they are incapable of forming zwitterions. They are conveniently made by the reaction of a thiophenol and a suitable base with a 1,4- or 1,5-alkylene compound having displaceable terminal groups such that 5- or 6-membered cycloaliphatic rings including the sulfur atom of the thiophenol compound are formed:

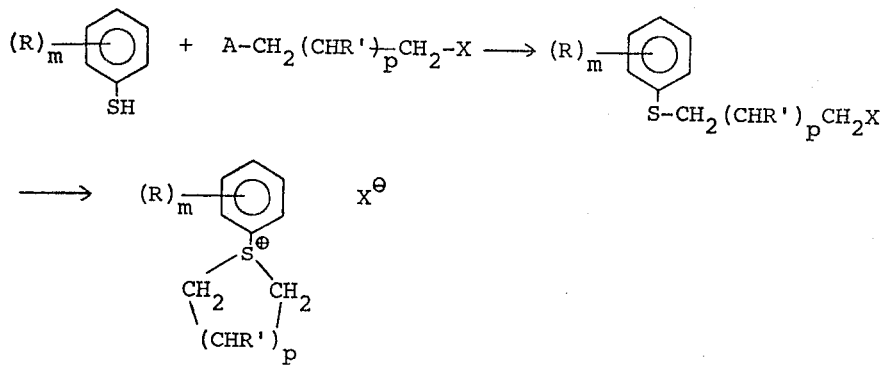

wherein A is Cl, Br, I, arylsulfonate, etc., X is a readily displaceable weakly nucleophylic group, such as Cl, HSO₄ or arylsulfonate or a group, such as OH, that is readily convertible to a weak nucleophyle, such as arylsulfonate, chlorosulfonate, or the like and the other symbols have the same significance as hereinbefore. Such a method is shown by T. Nambura and N. Matsuhisa, Yakugaky Zasshi, 83, 642 (1963).

SPECIFIC EMBODIMENTS OF THE INVENTION

The following examples illustrate the practice of the invention.

Redwood siding lumber, being especially prone to discoloration of latex paints by the migration of tannin, was used as the base for the tests. Since the tendency to stain varied somewhat from board to board, comparative tests were usually carried out on samples of the same board.

From 0.5 to 5% by weight, based on the total paint formulations, of the sulfonium compounds were added to the paints and 2-inch stripes were painted across the side of the board, alternate stripes being the control (same paint without additive). The paint used was a low pigment volume white acrylic enamel made with a commercial latex sold under the name Rhoplex AC-507.

The sulfonium compounds tested were as follows:

TABLE I

| Example | Compound |
|---|---|
| 1 | 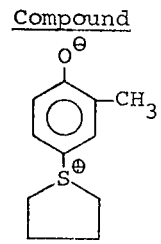 |
| 2 | 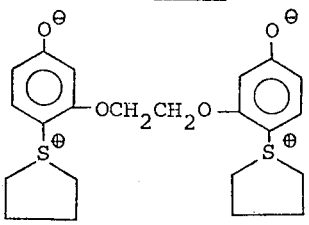 |
| 3 | 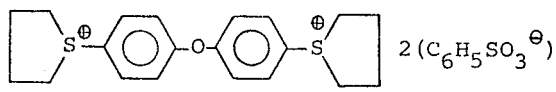 |
| 4 | 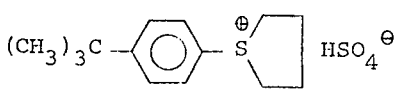 |
| 5 | 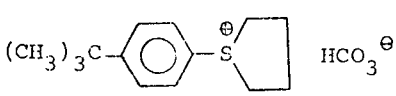 |
| 6 | A 60:40, by weight, mixture of the compounds of Examples 1 and 2. |

TABLE I (cont.)

| Example | Compound |
|---|---|
| 7 | 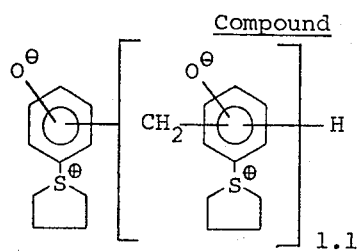 1.1 |
| 8 | 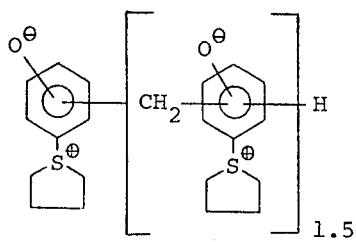 1.5 |

After 24 hours, the painted specimens were visually examined for staining. All of the control stripes were badly stained. Those containing 0.5% of a sulfonium compound showed marked inhibition of staining and most of them showed little or no staining. At the level of 1%, only slight indications of staining were seen while at 2.5% there was essentially complete inhibition of staining.

After the above test stripes were thoroughly dried, a commercial 35% pigment volume white acrylic latex exterior topcoat paint was applied longitudinally over the test stripes. After 24 hours this topcoat was visually examined for staining. Again, all the control stripes of the first coat showed severe staining through the topcoat. No staining was visible from any of the test stripes, even where the first coat had shown some staining.

Good results are also obtained by applying an aqueous solution of the sulfonium compound to the bare wood and then, after drying, applying the latex paint, in which case no sulfonium compound is needed in the paint.

Other examples of sulfonium compounds that inhibit the staining of latex paints when the latter are applied to redwood, red cedar and other woods that stain conventional latex paints are shown in the following table.

TABLE II

| Example | Compound |
|---|---|
| 7 | 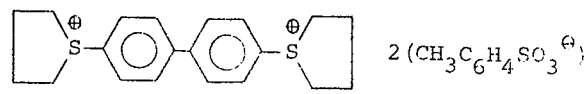 |
| 8 | 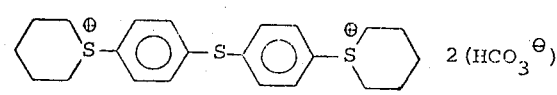 |
| 9 | 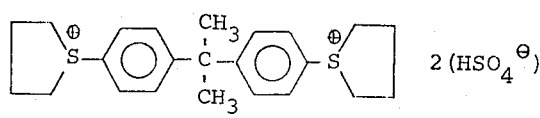 |
| 10 | 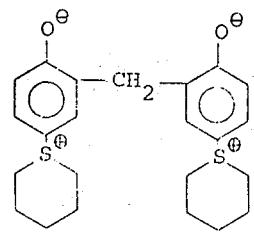 |
| 11 | 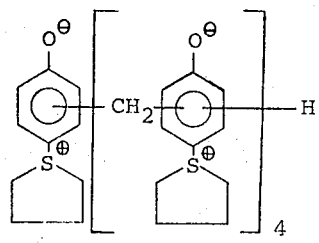 |

TABLE II (cont.)
| Example | Compound |
|---|---|
| 12 | 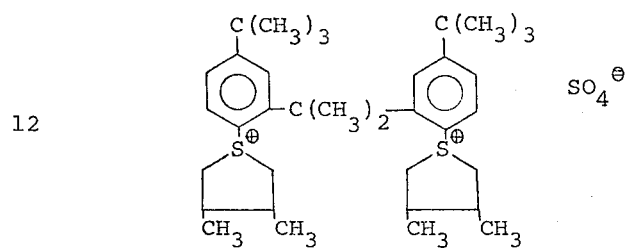 |
| 13 | 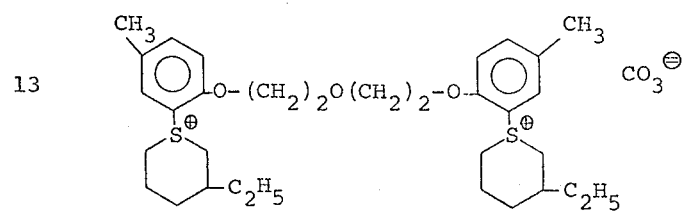 |
| 14 | 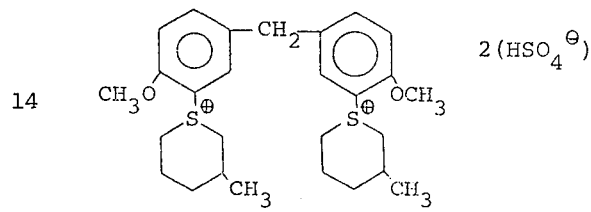 |
| 15 | 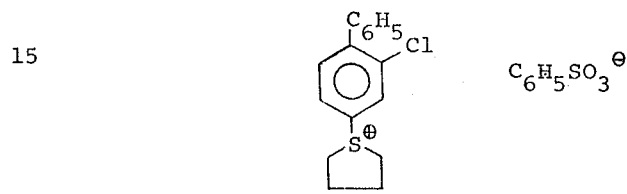 |
| 16 | 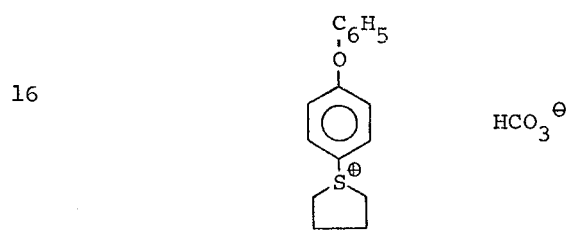 |
| 17 | 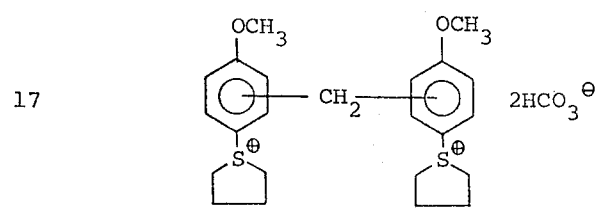 |

We claim:

1. The process of inhibiting the staining of latex paint applied to a wood surface containing water-soluble tannin comprising applying to the wood surface, prior to or concurrently with the latex paint, an aqueous solution of a water-soluble cyclic sulfonium compound of the formula

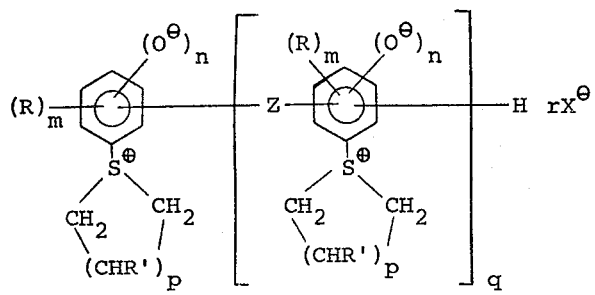

wherein each R independently is Cl, phenyl, phenoxy, lower alkyl or lower alkoxy; each R' independently is H, Cl, Br, OH or lower alkyl; Z is a chemical bond, O, S, alkylene or alkylenedioxy; $m$ is 0–2, $n$ is 0–1, $p$ is 2–3, $q$ is 0–5, X is a neutralizing anion and $r$ is a number such that the molecule is electrically neutral.

2. The process of claim 1 wherein the sulfonium compound is dissolved in the paint.

3. The process of claim 1 wherein $n$ is 1 and $r$ is 0.

4. The process of claim 1 wherein $p$ is 2 and R' is H.

5. The process of claim 1 wherein $m$ is 1 and R is $(CH_3)_3$.

6. Latex paint containing a stain-inhibiting amount of the sulfonium compound defined in claim 1.

7. Latex paint containing a stain-inhibiting amount of the sulfonium compound defined in claim 3.

8. Latex paint containing a stain-inhibiting amount of the sulfonium compound defined in claim 4.

9. Latex paint containing a stain-inhibiting amount of the sulfonium compound defined in claim 5.

10. The process of claim 2 wherein the paint is an acrylic or polyvinyl acetate latex.

11. The process of claim 1 wherein X is Cl, $HSO_4$, $C_6H_5SO_3$, $CH_3C_6H_4SO_3$ or $HCO_3$.

12. Latex paint containing a stain-inhibiting amount of the sulfonium compound defined in claim 11.

13. The latex paint of claim 12 wherein the paint is an acrylic or a polyvinyl acetate latex.

* * * * *